(12) United States Patent
Tateishi et al.

(10) Patent No.: US 6,521,171 B2
(45) Date of Patent: Feb. 18, 2003

(54) PROCESSING METHOD FOR HIGH-TEMPERATURE EXHAUST GAS

(75) Inventors: Masataka Tateishi, Osaka (JP); Masahiko Tetsumoto, Osaka (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/858,568

(22) Filed: May 17, 2001

(65) Prior Publication Data
US 2001/0042496 A1 Nov. 22, 2001

(30) Foreign Application Priority Data
May 19, 2000 (JP) ........................................ 2000-147381

(51) Int. Cl.$^7$ .............................................. B01D 47/06
(52) U.S. Cl. ......................... 266/46; 261/115; 266/147; 75/381
(58) Field of Search ................... 266/147, 46; 261/115, 261/DIG. 9; 75/381

(56) References Cited

U.S. PATENT DOCUMENTS

| | | |
|---|---|---|
| 3,431,707 A | 3/1969 | Berg |
| 4,642,127 A | 2/1987 | Ando et al. |
| 5,755,838 A | 5/1998 | Tanaka et al. |
| 5,989,019 A | 11/1999 | Nishimura et al. |
| 6,063,156 A | 5/2000 | Negami et al. |
| 6,129,777 A | 10/2000 | Fuji et al. |
| 6,149,709 A | 11/2000 | Uragami et al. |
| 6,152,983 A | 11/2000 | Kamijo et al. |
| 6,241,803 B1 | 6/2001 | Fuji |
| 6,251,161 B1 | 6/2001 | Tateishi et al. |
| 6,254,665 B1 | 7/2001 | Matsushita et al. |
| 6,258,149 B1 | 7/2001 | Sugiyama et al. |

FOREIGN PATENT DOCUMENTS

| | | | |
|---|---|---|---|
| EP | 640373 A2 * | 3/1995 | ................ 261/115 |
| JP | 5-231633 | 9/1993 | |
| JP | 7-133919 | 5/1995 | |
| JP | 9-53129 | 2/1997 | |
| JP | 9-96411 | 4/1997 | |
| JP | 10-1724 | 1/1998 | |
| JP | 11-302750 | 11/1999 | |

* cited by examiner

Primary Examiner—Melvyn Andrews
(74) Attorney, Agent, or Firm—Oblon, Spivak, McClelland, Maier & Neustadt, P.C.

(57) ABSTRACT

To effectively separate and recover solid dust and volatile or molten components while preventing solid dust and volatile or molten component dust from being adhered to inner walls of a temperature control tower.

The high-temperature exhaust gas is blown from a gas blowing port 2a above a temperature control tower 2 through an exhaust gas inlet duct 3, cooling water is sprayed obliquely downward toward the substantially center of a gas flow of the high-temperature exhaust gas from cooling water spray nozzles 5, cooling gas is injected so as to be a downward whirling gas flow along the inner walls of the temperature control tower 2 from first stage cooling gas injection nozzles 6 and second stage cooling gas injection nozzles 7 therebelow, and lowering a temperature of the high-temperature exhaust gas while preventing solid dust and volatile or molten components from being adhered to the inner walls of the temperature control tower 2, whereby the volatile or molten components are solidified into volatile or molten component dust, the solid dust is discharged and recovered from the bottom of the temperature control tower 2, and the volatile or molten component dust is recovered by a bag filter 10 provided downstream of a lower discharge duct 4.

8 Claims, 6 Drawing Sheets

PROCESSING METHOD FOR HIGH-TEMPERATURE EXHAUST GAS

BACKGROUND OF THE INVENTION

1. Field of the Invention

The present invention relates an improvement in a processing method for high-temperature exhaust gas, and more specifically to a technical field of a processing method for high-temperature exhaust gas in which high-temperature exhaust gas discharged from a reducing furnace for producing reduced iron is controlled in temperature by a temperature control tower to enable effectively separating and recovering solid dust, and volatile and melting components contained in the high-temperature exhaust gas.

2. Description of the Related Art

As is known, the temperature control tower has a function for cooling the high-temperature exhaust gas discharged from a high-temperature gas generating source such as incinerator, a melting furnace or the like by spraying cooling water or by a wet type processing method using a scrubber in order to use it as a heat source for a boiler in the subsequent step and to obtain a temperature suitable for being processed by a bag filter.

However, flying ash or solid dust containing volatile components such as zinc, lead or the like, and melting components such as alkaline metal, oxide, chloride or the like are mixed in the high-temperature exhaust gas discharged from the incinerator or the melting furnace, and the temperature control of such a high-temperature exhaust gas containing such a flying ash or solid dust only by cooling water spray causes a problem of the adhesion of the liquefied matter of the volatile component or the solidified matter of the molten component to the inner wall of a temperature control tower. Further, the wet type processing method has a problem of being disadvantageous in respect of equipment cost such that water treatment equipment is necessary, because water-soluble components are contained in the volatile component or the melting component.

Therefore, for solving the problems noted above, various temperature control systems have been proposed. For example, there 3 a technique in which high-temperature gas is injected in a tangential direction of a circle formed by a horizontal section of a temperature control tower and obliquely downward from a purge gas blowing duct branched from an exhaust gas introducing duct to whirl the purge gas, and in which an overflow dam is provided at the upper part within a temperature control tower to flow down water over-flown from the overflow dam along the inner wall to thereby prevent the deposit from being adhered to the inner wall of the temperature control tower. There is another technique in which a plurality of high pressure liquid injection nozzles are provided on the pipe walls of a combustion exhaust gas cooling chamber (corresponding to a temperature control tower) to emit high-pressure fluid against the pipe inner walls of the combustion exhaust gas cooling chamber from these high-pressure liquid injection nozzles to thereby remove the deposited dust.

Further, as a technique for processing wastes containing iron or zinc, lead and so on which are volatile components, there is an exhaust gas processing method used when ironmaking and steelmaking wastes are processed, which merely cools exhaust gas by cooling oil, which makes exhaust gas to pass through a coke filling layer, and which makes exhaust gas to pass through a cyclone to recover dust.

In the case where the high-temperature exhaust gas is blown-in as purge gas to whirl it, the volatile and melting components contained in the high-temperature exhaust gas cannot be cooled completely, and therefore, the effect of preventing the volatile and melting components from being adhered to the inner walls of the temperature control tower is not always obtained satisfactorily. Further, the flowing down of water along the inner walls of the temperature control tower requires water treatment equipment for processing the water-soluble components. Furthermore, in the case where high-pressure fluid is emitted, this is a mere expectant treatment, not preventing the volatile and melting components themselves contained in the high-temperature exhaust gas from being adhered to the inner walls of the temperature control tower. Besides, this is a mere technique relating to cooling of the high-temperature exhaust gas, which is not for a purpose of separating and recovering solidified solid dust to effectively use recycling or the like.

Incidentally, equipment for combusting-melting processing wastes containing metal such as a furnace for directly melting industrial wastes has been recently studied. In cases of such equipment as described, since many of volatile low melting-point substances such as zinc, lead, alkaline metal such as Na and K are contained, a problem of adhesion of the low melting-point substances is more conspicuous. Further, attention has been paid to a technique in which a carbonaceous reducing agent such as coal, metal oxide such as iron ore or wastes containing metal oxide, as raw materials, at a high temperature of not less than 1000° C. are reduced or reduced and molten to obtain reduced iron. However, since these raw materials contain a large quantity of volatile and melting components and gases at an extremely high temperature are generated, cooling of gas is hard to consistent with the prevention of adhesion, and at the present time, an effective temperature control tower is not proposed.

In the case where the exhaust gas is cooled by cooling oil, since oil is contained in the exhaust gas after temperature has been controlled, it is necessary to provide separate equipment for the post-processing of exhaust gas. In the case where the exhaust gas is allowed to pass through the coke filling layer, when solid iron oxide or volatile component such as zinc and lead are contained in the exhaust gas, these are easily adhered to the coke, and closure (blockage) occurs, thus posing a problem in that continuous operation is difficult. Further, in the case where the exhaust gas is allowed to pass through the cyclone, since cooling is not conducted, solid dust of large size can be separated but when sold iron oxide or volatile component is contained in the exhaust gas, these are easily adhered to the inside of the cyclone, and closure easily occurs, thus posing a problem in that continuous operation is difficult. All these cases attach importance to the recovery of dust, but are not provided with the cooling performance capable of sufficiently cooling the high-temperature exhaust gas. There has not been provided a processing method capable of being consistent the cooling of the high-temperature exhaust gas with separation and recovery of solid dust, every dust component.

Moreover, in prior art, even if the dust components should be recovered, they are not separated every component. Therefore, the recycle cannot be achieved of course, and the effective utilization cannot be made. Disposal was only way to do.

Furthermore, in the case where cooling is made merely by spraying cooling water as in prior art, there poses a problem in that it is necessary to increase a quantity of spraying cooling water so that it easily causes the trouble of corrosion by acid and also the volatile and melting components are excessively cooled to make large the grain size of the solidified volatile and melting component dust, and both the solid dust and the volatile and melting component dust become precipitated under the temperature control tower 2, failing to separate and recover them.

SUMMARY OF THE INVENTION

It is therefore an object of the present invention to provide a processing method for high-temperature exhaust gas for cooling high-temperature exhaust gas effectively while effectively preventing adhesion of volatile or molten components to the inner walls of a temperature control tower, solidifying the volatile or molten components to effectively separate and recover solid dust and the volatile or molten components, and enabling acceleration of recycling of the dust recovered.

Means employed by the processing method for high-temperature exhaust gas according to claim 1 or 2 of the present invention for solving the above-described problems comprises: blowing high-temperature exhaust gas discharged from a high-temperature gas generating source into a temperature control tower provided with an extended step part whose diameter is extended toward the downstream of the high-temperature exhaust gas, spraying cooling water toward a gas flow of the high-temperature exhaust gas blown, and further, injecting cooling gas along the inner walls of the temperature control tower from cooling gas injection means provided on the extended step part, controlling the temperature so that the high-temperature exhaust gas blown assumes an adequate temperature, discharging and recovering solid dust separated from the high-temperature exhaust gas by the temperature control outside the temperature control tower, and recovering volatile or molten dust contained in the exhaust gas after having been controlled in temperature discharged from the temperature control tower by a bag filter.

Means employed by the processing method for high-temperature exhaust gas according to claim 3 of the present invention depending on claim 1 lies in that cooling gas is injected, from the cooling gas injection means, obliquely downstream so as to be a whirling gas flow along the inner walls of the temperature control tower.

Means employed by the processing method for high-temperature exhaust gas according to claim 4 of the present invention depending on either claim 1 or 3 lies in that cooling gas is injected, from cooling gas injection means provided on the upstream side of the extended sit, in a quantity more than that of cooling gas injection means provided on the downstream side.

Means employed by the processing method for high-temperature exhaust gas according to claim 5 of the present invention depending on any of claims 1 to 4 lies in that unrecovered solid dust contained in the exhaust gas after having been controlled in temperature discharged from the temperature control tower is recovered by a cyclone before the volatile or molten component dust is recovered by the bag filter.

Means employed by the processing method for high-temperature exhaust gas according to claim 6 of the present invention depending on any of claims 1 to 4 lies in that unrecovered solid dust contained in the exhaust gas after having been controlled in temperature discharged from the temperature control tower is recovered by a high-temperature bag filter before the volatile or molten component dust is recovered by the bag filter.

Means employed by the processing method for high-temperature exhaust gas according to claim 7 of the present invention depending on any of claims 1 to 6 lies in that the high-temperature gas generating source is a reducing furnace which reduces, or reduces and melts at a high temperature the raw material containing a carbonaceous reducing agent such as coal and metal oxide contained substances such as iron ore to produce reduced metal.

DESCRIPTION OF THE PREFERRED EMBODIMENTS

Figure 1:
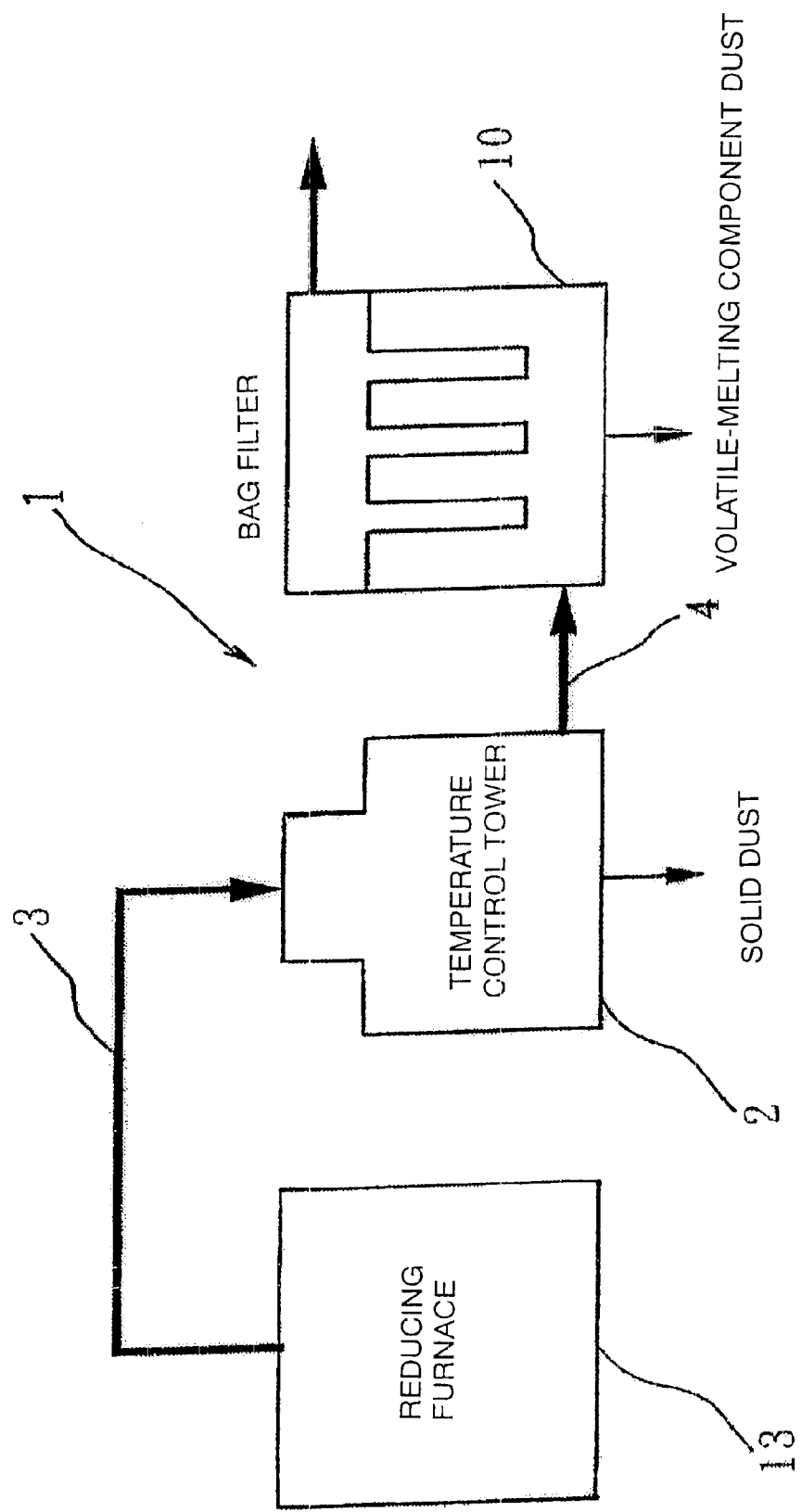
FIG. 1 is a schematic system explanatory view of a temperature control system according to embodiment 1 the present invention.

The temperature control system according to Embodiment 1 for realizing the processing method for high-temperature exhaust gas according to the present invention will be described hereinafter with reference to FIG. 1, a schematic system explanatory view, and FIG. 2, a sectional view of a temperature control tower.

Reference numeral 1 shown in FIG. 1 designates a temperature control system, which temperature control system 1 comprises a temperature control tower 2 constituted as described later in which high-temperature gas discharged from a reducing furnace 13 which is a high-temperature generation source, namely, a high-temperature generation source for reducing a carbonaceous reducing agent such as coal and metal oxide such as iron ore and raw material containing metal oxide at a high temperature or reducing-melting them to produce reduced iron or the like and controlling temperature, thereby precipitating and separating solid dust, which is main raw material fine contained in the high-temperature exhaust gas, and solidifying volatile or molten components such as zinc, lead, alkaline metal, etc., and a bag filter 10 for separating and recovering volatile or molten component dust in the solidified form of the volatile or molten components discharged accompanied by the exhaust gas temperature controlled and discharged from the temperature control tower 2.

The solid dust is a substance in which powdery coal, iron or ore as raw material is discharged as it is or in the reduced state, and many of which are iron oxide powder and iron powder. The volatile or molten component dust is mainly zinc, lead, alkaline metal such as Na or K, and partly includes oxide, sulfide, and chloride thereof It is noted that a heat exchanger such as a boiler, an air preheater and the like can be disposed before or after the process of the bag filter 10 to recover heat. Further, as raw material, wastes can be utilized such as coal, coke, iron ore, blast furnace dust, electric furnace dust, and stainless dust.

Figure 2:
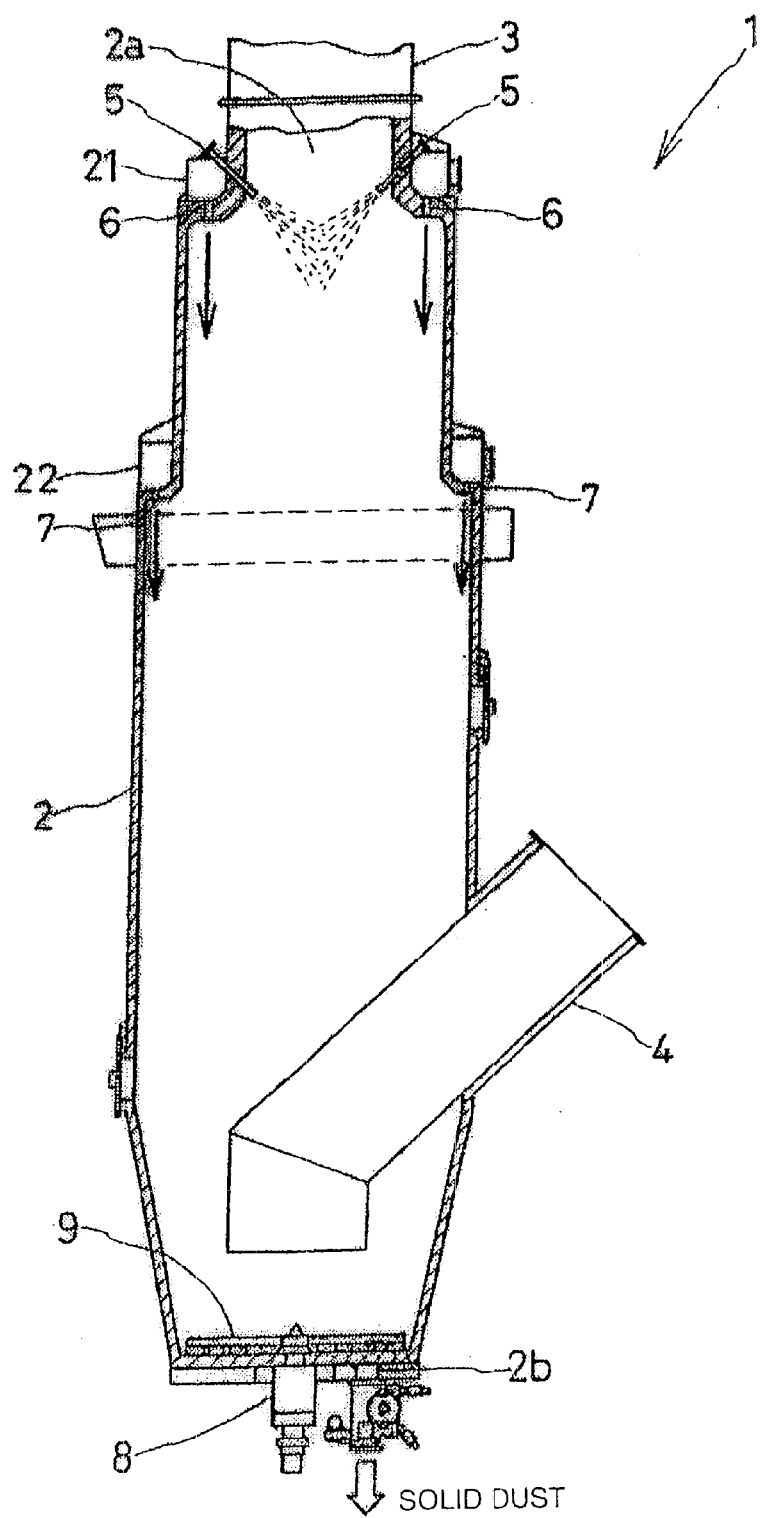
FIG. 2 is a sectional view of a temperature control tower of the temperature control system according to Embodiment 1 of the present invention.

The temperature control tower 2 is formed to be a cylindrical shape with upper and lower long steps, as shown in FIG. 2, and an exhaust gas inlet duct 3 described later which allows the high-temperature gas discharged from the reducing furnace 13 to flow into the temperature control tower 2 is communicated with a gas blowing port 2a provided at the upper part of the temperature control tower 2. Further, a lower discharge duct 4, which opens on the bottom side of the temperature control tower 2, extends obliquely upward extending through the body wall of the temperature control tower 2, and guides the exhaust gas controlled in temperature so as to assume an adequate temperature to the bag filter 10, is communicated with the bag filter 10 from the bottom of the temperature control tower 2.

The temperature control tower 2 is formed to be a stepped cylindrical shape, as described above, and is formed somewhat downward from the upper end with a first extended step part 21, and is formed downward of the first extended step part 21 and at the position above the middle portion in the vertical direction with a second extended step part 22 larger in diameter than that of the first extended step part 21. In the outer circumferential part of a small diameter part above the first extended step part 21 are provided a plurality of cooling water spray nozzles 5 which extend obliquely downward, extend through the small diameter part, and spray cooling water toward the center of a gas flow of the high-temperature exhaust gas blown in from the gas blowing port 2a. Spraying holes of the cooling water spray nozzles 5 are directed at substantially the center and obliquely downward (downstream) of a gas flow of the high-temperature exhaust gas because of the aim so as not to disturb a whirling gas flow of cooling gas injected from cooling gas injection nozzles described later. In Embodiment 1 of the present invention, the direction of the spraying holes of the cooling water spray nozzles 5 is set to approximately 45° obliquely downward.

In the annular plane of the first extended step part 21 are provided a plurality of first stage cooling gas injection nozzles 6 for injecting cooling gas from a tangential direction to be an obliquely downward whirling gas flow, and in the annular plane of the second extended step part 22 are provided a plurality of second stage cooling gas injection nozzles 7, which has the same constitution as that of the first stage cooling gas injection nozzles 6, for injecting cooling gas from a tangential direction to be an obliquely downward whirling gas flow for injecting cooling gas from a tangential direction to be an obliquely downward whirling gas flow along the inner walls of the temperature control tower 2.

That is, when the cooling gas is made to be a downward whirling gas flow along the inner walls of the temperature control tower 2 to prevent direct contact of the high-temperature exhaust gas with the inner walls of the temperature control tower 2, the volatile or molten component dust will not adhere to the inner walls of the temperature control tower 2 and not enlarge. Therefore, the volatile or molten components are cooled and solidified by the whirling gas flow of the cooling gas and the cooling water, but since the particle size is not excessively large and remains to be fine, they are accompanied by the exhaust gas without being precipitated in the temperature control tower 2.

On the other hand, the solid dust which is large in particle size is apt to be precipitated. Accordingly, the solid dust large in particle size is mainly precipitated on the bottom of the temperature control tower 2 and separated and recovered, whereas the volatile and melting component dust small in particle size is mainly separated and recovered by the bag filter 10.

Incidentally, in the Embodiment 1, the first stage cooling gas injection nozzles 6 (upstream side) and the second stage cooling gas injection nozzles 7 (downstream side) are provided in a relationship of upper and lower positions, as described above. However, since a third extended step part can be provided at the lower position of the second stage cooling gas injection nozzles 7, and a plurality of third stage cooling gas injection nozzles can be provided in the annular plane of the third extended step part, there is not limited to the number of stages of the cooling gas injection nozzles. It is noted that injecting cooling gas in the same direction as the blowing direction of the high-temperature exhaust gas is preferable because the whirling gas flow is not reduced in speed.

The temperature control tower 2 is provided at the bottom with a dust discharge device for discharging large-sized solid dust precipitated externally of the temperature control tower 2 in order to recover the solid dust.

The dust discharge device comprises a known cyclo speed reducer 8, and a dust scraper 9 which is rotated about the diametrical center of the bottom of the temperature control tower 2 by the operation of the cyclo speed reducer 8 to scrape off or scrape up the solid dust precipitated and adhered to or stayed on the bottom, and discharge them from the dust discharge port 2b opened to the bottom to the outside of the temperature control tower 2.

The operating form of the Embodiment 1 for realizing the processing method for high-temperature exhaust gas of the present invention will be described hereinafter. The high-temperature gas containing the solid dust and the volatile or molten components discharged from the reducing furnace 13 is blown into the temperature control tower 2 from the gas blowing port 2a through the exhaust gas introducing duct 3. The high-temperature exhaust gas blown into the temperature control tower 2 is taken away in heat by vaporization of cooling water sprayed from the plurality of cooling water spray nozzles 5 provided above thee temperature control tower 2, and moves down while lowering the temperature to reach the bottom of the temperature control tower 2, and the temperature-controlled exhaust gas is discharged from the lower discharge duct 4.

Simultaneously therewith, the cooling gases are injected from the first and second stage cooling gas injection nozzles 6 and 7 parallel with the spraying of cooling water from the cooling water spray nozzle 5. However, since the cooling water is sprayed toward substantially the center of the gas flow of the high-temperature exhaust gas blown in, the cooling gas injected is turned into a downward whirling gas without being affected by the cooling water sprayed to cover the inner walls of the temperature control tower 2. The temperature of the gas flow of the high-temperature exhaust gas lowers as it moves down along the temperature control tower 2 so that the volatile or molten component in the high-temperature gas is solidified and the direct contact of the inner walls of the temperature control tower 2 with the high-temperature exhaust gas is arrested by the downward whirling gas flow of the cooling gas, because of which the solid dust or the volatile or molten component dust is not adhered to the inner walls of the temperature control tower 2. Thereby, the solid dust is precipitated on the bottom of the temperature control tower 2, and the volatile or molten component becomes solidified into the volatile or molten component dust, most of which are however discharged from the lower discharge duct 4 together with the exhaust gas.

As described above, the first and second stage cooling gas injection nozzles 6 and 7 are provided, and even in the case where a large quantity of high-temperature exhaust gases are subjected to temperature-control processing, the high-temperature exhaust gas can be cooled effectively while preventing the solid dust and the volatile or molten components from being adhered to the inner walls of the temperature control tower 2 for the solidified volatile or molten component dust. The cooling gas in larger quantity than that of the second stage cooling gas injection nozzles 7 are injected from the first stage cooling gas injection nozzles 6 on the upper step side, whereby the upper inner wall portion of the temperature control tower 2 into which flows a gas flow of the high-temperature exhaust gas blown in which is highest in temperature and containing much solid dust and the volatile or molten components are covered with the whirling gas flow of a large quantity of cooling gases to thereby positively prevent the solid dust and the volatile or molten components from being adhered to the upper inner wall portions, thus enabling efficient separation and recovery of most of the solid dust and the volatile or molten component dust in the exhaust gases.

That is, according to the Embodiment 1 of the present invention, since the cooling water is injected and the cooling gas is blown in and whirled, the adhesion preventive effect of the volatile or molten component themselves to the inner walls of the temperature control tower 2 is excellent. Because of this, the trouble caused by the adhesion to the inner walls is avoided while maintaining the cooling performance in the temperature control tower 2, and the separation and recovery that recovers the solid dust in the temperature control tower 2 and recover the volatile or molten component dust in the bag filter 10 can be accomplished whereby the dust can be recovered every component. Accordingly, the dust separated and recovered can be effectively used by component since they are highly pure.

Furthermore, according to the Embodiment 1, since oil is not contained in the exhaust gas after the temperature control as in the prior art, it is not necessary to provide separate equipment for the purpose of the post-processing of the exhaust gas; since the exhaust gas is not allowed to pass through the coke filing layer as in another prior art, the temperature control system 1 can be continuously operated while effectively separating and recovering the solid dust and the volatile or molten component dust contained in the exhaust gas; and in the case where the exhaust gas is allowed to pass through the cyclone, the cooled and temperature-controlled exhaust gas is allowed to pass, different from still another prior art, and therefore, the unrecovered solid dust can be separated and recovered, and the solid dust and the volatile or molten component dust can be separated and recovered with better accuracy without trouble such as adhesion of the volatile or molten components.

By the way, in the present Embodiment 1, the constitution that the high-temperature exhaust gas is introduced from the upper part of the temperature control tower and discharged from the lower part is explained, however, on the contrary, the high-temperature exhaust gas may be introduced from the lower part of the temperature control tower and discharged from the upper part. In this case, the cooling water and/or the cooling gas may be blown upward from the lower part, and further, the extended step part may be extended in diameter toward the upper side of the temperature control tower from the lower side.

Further, in the present Embodiment 1, the constitution that both of the cooling water and the cooling gas are blown is explained, however, only the cooling water may be blown corresponding to the operation condition, for example, the quantity or the temperature of the high-temperature exhaust gas, or the target temperature after cooling. Even in this case, the effect of the present invention can be obtained by the extended step part, the bag filter and so on.

Furthermore, in the present Embodiment 1, the constitution that the extended step part is extended suddenly is explained, however, the extended step part may be extended gradually.

Figure 3:
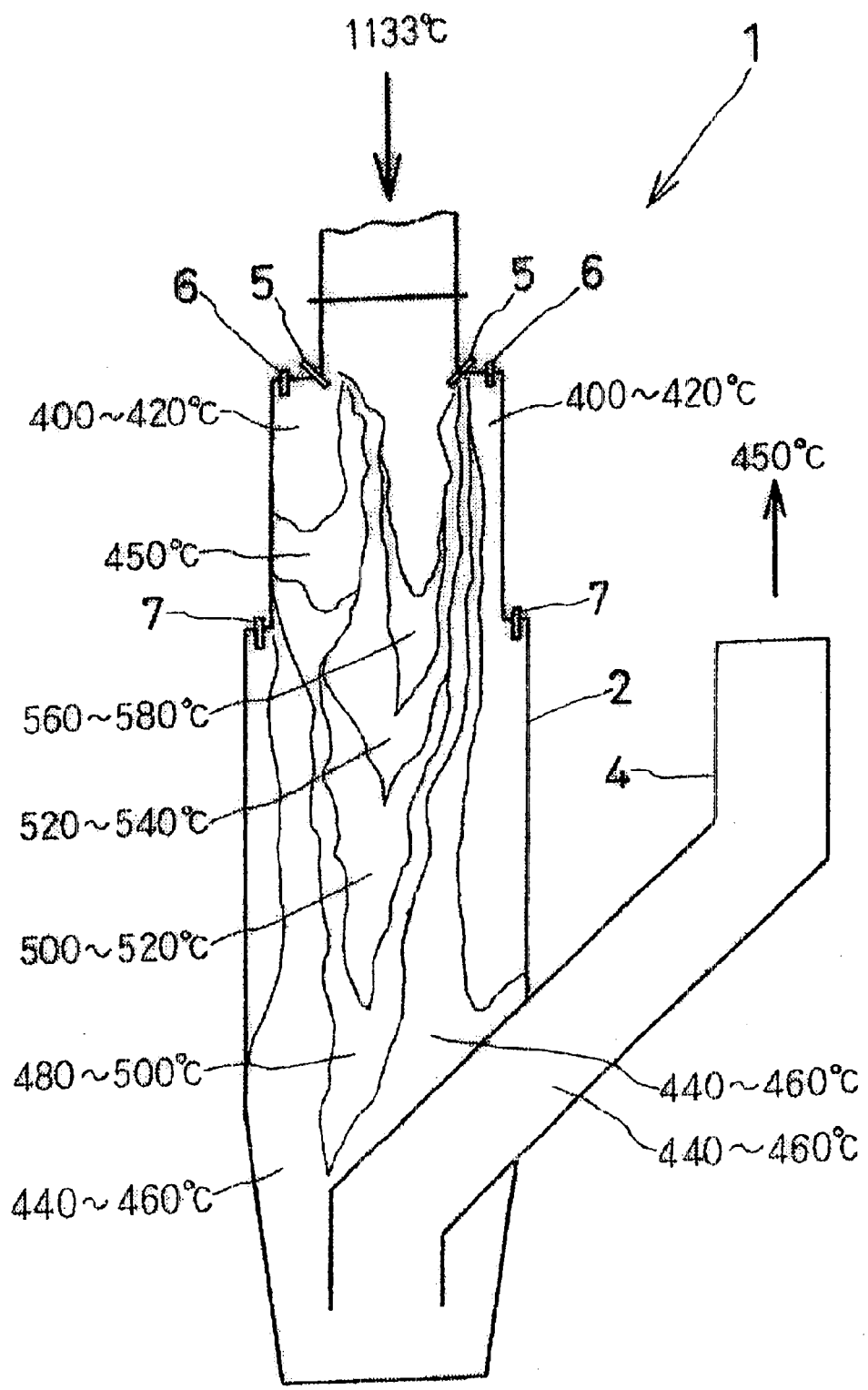
FIG. 3 is a temperature distribution explanatory view of a temperature control system according to the embodiment of the present invention.

A description will be made, with reference to FIG. 3, a temperature distribution explanatory view of the temperature control tower, of an embodiment for cooling and controlling the high-temperature exhaust gas discharged from the reducing furnace 13 for producing reduced iron according to Embodiment 1 of the present invention.

In the high-temperature exhaust gas discharged from the reducing furnace 13 are contained a large quantity of volatile or molten components (lead, zinc, alkaline metal and oxide thereof), as previously described. The temperature of the high-temperature exhaust gas is normally 700 to 1400° C.

The components of the high-temperature exhaust gas include $CO_2$: 20 volume %, $N_2$: 67.3 volume %, $H_2O$: 11.8 volume %, and $O_2$: 0.9 volume %.

Such a high-temperature exhaust gas is controlled in temperature to 350 to 600° C. according to the kind of apparatus on the post-step side, but in the case where less quantity of heat recovery will suffice or in the case where the melting/softening point of dust is low, and in the case where the exhaust gas discharged from the lower discharge duct 4 is processed by the normal bag filter 10, the temperature thereof is controlled so as to assume a temperature on the low temperature side, 350° C. Incidentally, in the case where a large quantity of heat recovery is necessary, or in the case where the melting/softening point of dust is high, and in the case of supplying to the boiler, or processing in the high-temperature bag filter, the temperature is controlled so as to assume a temperature on the high temperature side, 600° C.

The cooling gas injected into the temperature control tower 2 may be a temperature at which the wall surface temperature of the temperature control tower 2 can be held at not more than 600° C., preferably, not more than 550° C., the temperature being suffice to a temperature not more than that of the exhaust gas controlled in temperature discharged form the lower discharge duct 4, or a temperature not more than the softening/melting point of the volatile or molten components, and containing no volatile or molten components. For example, air, nitrogen, inert gas, and gas discharged from the lower discharge duct 4 and processed by the bag filter can be used, gas discharged from the raw-material drying step can be used as cooling gas if the high-temperature gas generating source is a reducing furnace or a waste processing furnace, and combustion air or secondary combustion air used in a incinerator, a melting furnace, a reducing furnace or a waste processing furnace can be used as cooling gas.

In the case of the present embodiment, air at normal temperature is used as cooling gas. Air of 370 m³/min was injected at flow velocity of 20 m/s from the first stage cooling gas injection nozzles 6, air of 350 m³/min was injected at flow velocity of 20 m/s from the second stage cooling gas injection nozzles 7, and cooling water of 65 dm³/min was sprayed from the cooling water spray nozzles 5.

As a result, the high-temperature exhaust gas at 1133° C. flowing into the exhaust gas inlet duct 3 is effectively controlled in temperature, and the exhaust gas controlled in temperature at 450° C. was discharged from the lower discharge duct 4.

In the portions close to the inner walls of the temperature control tower 2 being a whirling gas flow injected from the first stage cooling gas injection nozzles 6 and the second stage cooling gas injection nozzles 7, the high-temperature. exhaust gases are effectively cooled vertically to assume 400 to 420° C., showing that.the downward whirling gas flow of cooling air is not fallen into disorder. The injecting speed of cooling gas is preferably 18 m/s, more preferably 20 m/s.

Figure 4:
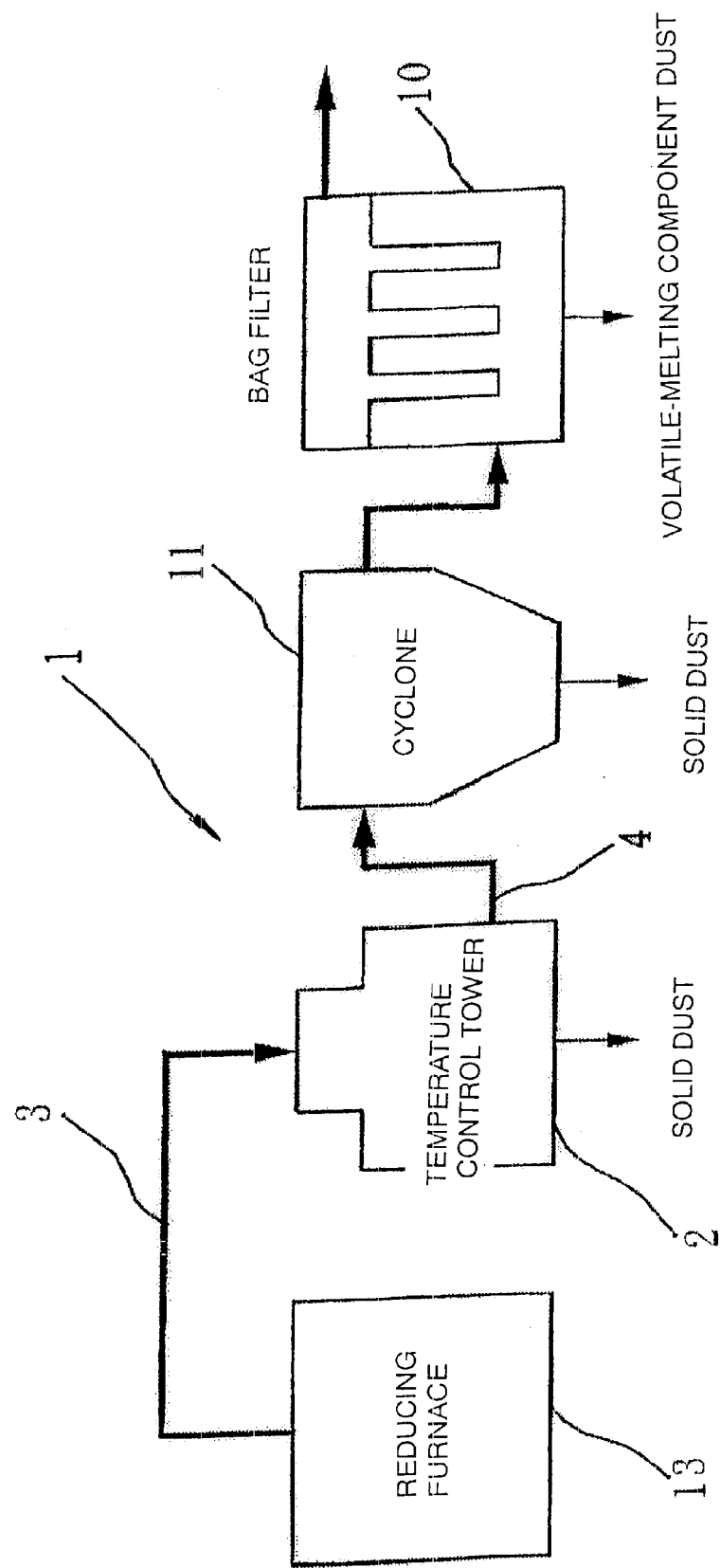
FIG. 4 is a schematic system explanatory view of a temperature control system according to embodiment 2 of the present invention.

In the foregoing, as an example, the temperature control system 1 provided with the bag filter 10 for separating the volatile or molten components on the post-step side of the temperature control tower 2 has been explained. However, for example, the temperature control system 1 may comprise, as shown in FIG. 4, a schematic system explanatory view according to Embodiment 2, a temperature control tower 2 having the exactly same constitution as that of the temperature control tower of the temperature control system according to Embodiment 1, which cools and temperature-controls the high-temperature exhaust gas discharged from the reducing furnace 13, a cyclone 11 for separating and recovering unrecovered solid dust in the exhaust gas controlled in temperature discharged from the temperature control tower 2, and a bag filter 10 for separating and recovering the volatile or molten component dust contained in the exhaust gas discharged from the cyclone 11. By the provision of the cyclone 11, As in the temperature control system 1 according to Embodiment 2, the solid dust that cannot be recovered by the temperature control tower 2 can be separated and recovered, thus bringing forth the effect that the purity of the volatile or molten component dust recovered by the bag filter 10 is enhanced to enable effective use thereof.

Figure 5:
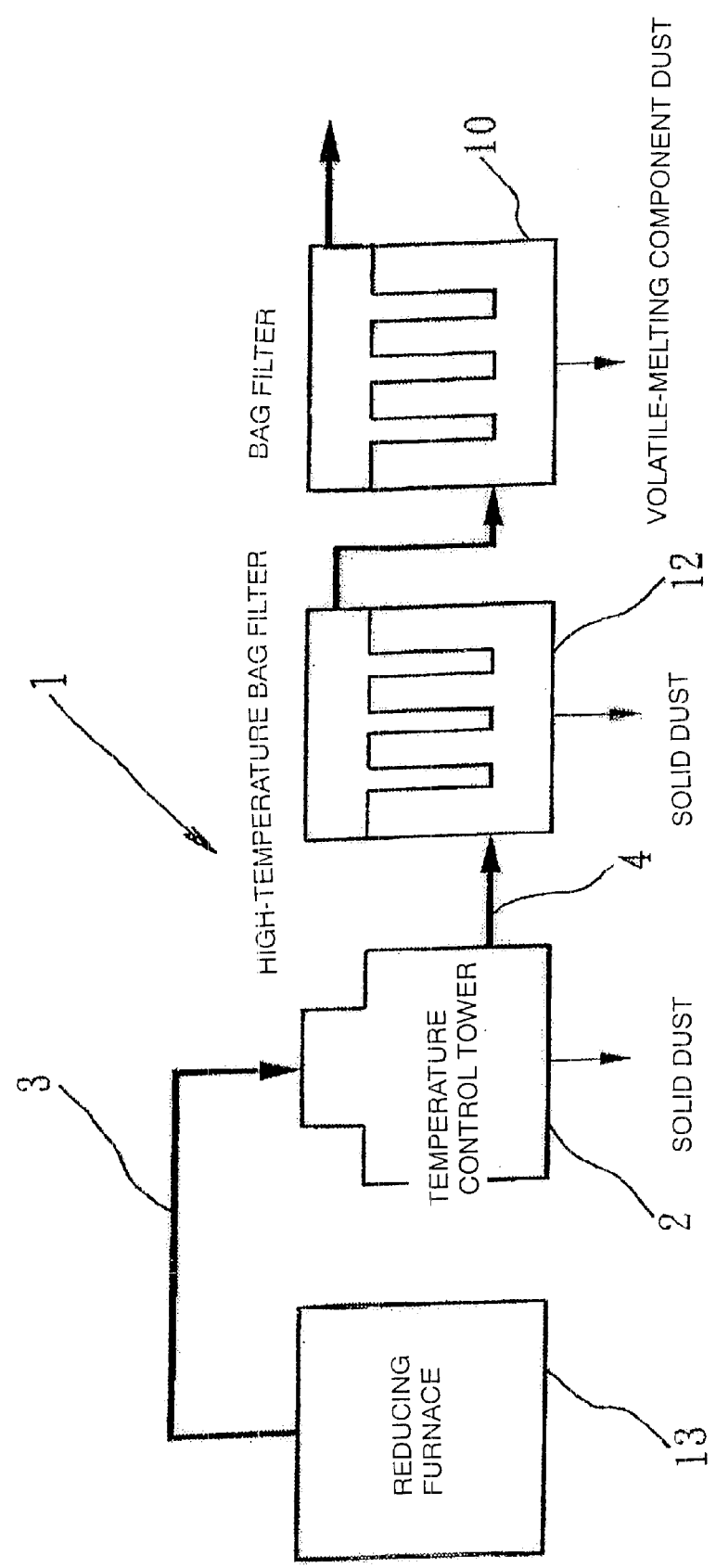
FIG. 5 is a schematic system explanatory view of a temperature control system according to Embodiment 3 of the present invention.

Further, the temperature control system 1 may comprise, as shown in FIG. 5, a schematic system explanatory view according to Embodiment 3, a temperature control tower 2 having the exactly same constitution as that of the temperature control tower of the temperature control system according to Embodiment 1, which cools and controls the high-temperature exhaust gas discharged from the reducing furnace 13, a high-temperature bag filter 12 for separating and recovering unrecovered solid dust in the exhaust gas controlled in temperature discharged from the temperature control tower 2, and a bag filter 10 for separating and recovering the volatile or molten component dust contained in the exhaust gas discharged from the high-temperature bag filter 10. By the provision of the high-temperature bag filter 12, as in the temperature control system 1 according to Embodiment 3, the solid dust that cannot be recovered by the temperature control tower 2 can be separated and recovered, thus bringing forth the effect that the purity of the volatile or molten component dust recovered by the bag filter 10 is enhanced to enable effective use thereof.

Figure 6:
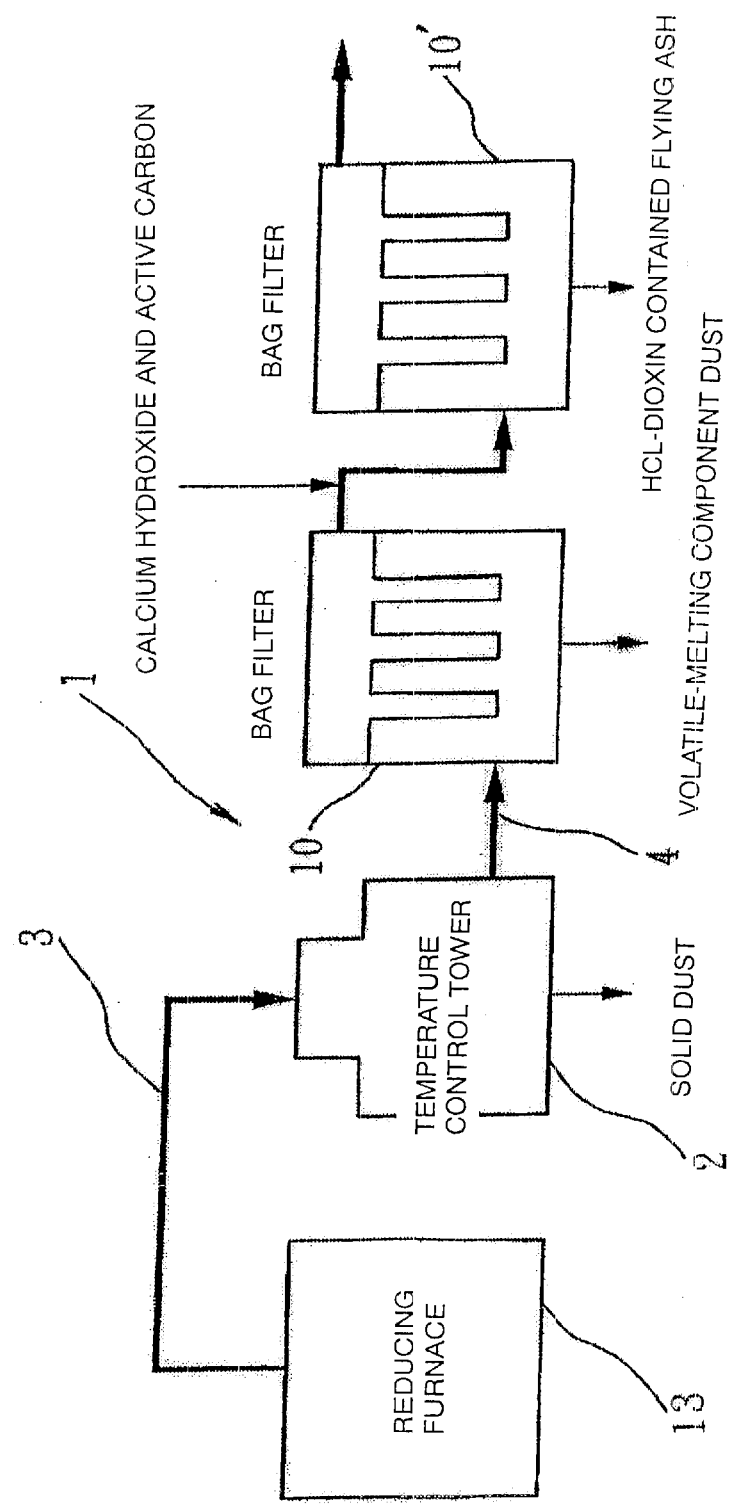
FIG. 6 is a schematic explanatory view of a temperature control system according Embodiment 4 of the present invention.

Furthermore, as shown in FIG. 6, a schematic system explanatory view, according to Embodiment 4, the high-temperature system 1 may comprise a temperature control tower 2 for cooling and temperature-controlling the high-temperature exhaust gas discharged from the reducing furnace 13, and a bag filter 10 for separating and recovering the volatile or molten components contained in the exhaust gas controlled in temperature and discharged from the temperature control tower 2, a second bag filter 10' (which has a constitution equal to that of the bag filter 10) is provided on the post-step side of the bag filter 10, and hydrated lime and activated charcoal are added to and flown into the exhaust gas from which the volatile or molten component dust flowing into the second bag filter 10' is separated and recovered by the bag filter 10. The provision of the second bag filter 10' on the post-step side of the bag filter 10, giving rise to the effect that HCl-dioxin contained flying ash containing the solid dust and volatile or molten component dust results, and the HCl-dioxin contained flying ash can be removed with out increasing the quantity of flying ash.

As described in detail above, according to the processing method for high-temperature exhaust gas according to claims 1 to 9 of the present invention, cooling water is sprayed toward the substantially center of the gas flow of the high-temperature exhaust gas blown into the temperature control tower, and cooling gas is injected along the inner walls of the temperature control tower whereby the high-temperature exhaust gas, solid dust, and volatile or molten components are effectively cooled, and the volatile or molten components are not excessively solidified. The inner walls of the temperature control tower are intercepted from the high-temperature exhaust gas by the-gas flow of the cooling gas flowing along the inner walls of the temperature control tower without being disordered by the spraying of cooling water, and so, the solidified volatile or molten components are not adhered to the inner walls of the temperature control tower and enlarged. Accordingly, there is an excellent effect that the cooling performance of the temperature control tower is maintained and trouble such as the adhesion to the inner walls is avoided, and the solid dust and the volatile or molten components can be separated and recovered efficiently every component.

Further, water processing equipment for processing water-soluble components is unnecessary, and oil is never contained in the exhaust gas after temperature controlling, whereby separate equipment for post-processing the exhaust gas need not be provided. Since the exhaust gas is not allowed to pass through the coke filling layer, metal oxide as solid dust and zinc or the like as volatile or molten components contained in the exhaust gas are separated and recovered efficiently, and at the same time, the temperature control system 1 can be operated continuously. Further, according to the processing method for high-temperature exhaust gas according to claims 5 to 6, the substances are allowed to pass through the cyclone and the high-temperature bag filter whereby the unrecovered solid dust can be separated and recovered, and the purity of the volatile or molten component dust recovered by the bag filter is enhanced, thus bringing forth the effect capable of effectively putting it to practical use.

We claim:

1. A processing method for high-temperature exhaust gas comprising:

blowing high-temperature exhaust gas discharged from a high-temperature gas generating source into a temperature control tower provided with an extended step part whose diameter is extended toward the downstream of the high-temperature exhaust gas, spraying cooling water toward a gas flow of the high-temperature exhaust gas blown, controlling the temperature so that the high-temperature exhaust gas blown assumes an adequate temperature, discharging and recovering solid dust separated from the high-temperature exhaust gas by the temperature control outside the temperature control tower, and recovering volatile or molten dust contained in the exhaust gas after having been controlled in temperature discharged from the temperature control tower by a bag filter.

2. The processing method for high-temperature exhaust gas according to claim 1 wherein cooling gas is injected along the inner walls of the temperature control tower from cooling gas injection means provided on the extended step part.

3. The processing method for high-temperature exhaust gas according to any of claims 1 to 2 wherein cooling gas is injected, from the cooling gas injection means, obliquely downstream so as to be a whirling gas flow along the inner walls of the temperature control tower.

4. The processing method for high-temperature exhaust gas according to any of claims 1 to 2 wherein cooling gas in injected, from cooling gas injection means provided on the upstream side of the extended step, in a quantity more than that of cooling gas injection means provided on the downstream side.

5. The processing method for high-temperature exhaust gas according to any of claims 1 to 2 wherein unrecovered solid dust contained in the exhaust gas after having been controlled in temperature discharged from the temperature control tower is recovered by a cyclone before the volatile or molten component dust is recovered by the bag filter.

6. The processing method for high-temperature exhaust gas according to any of claims 1 to 2 wherein unrecovered solid dust contained in the exhaust gas after having been controlled in temperature discharged from the temperature control tower is recovered by a high-temperature bag filter before the volatile or molten component dust is recovered by the bag filter.

7. The processing method for high-temperature exhaust gas according to any of claims 1 to 2 wherein the high-temperature gas generating source is a reducing furnace which reduces or reduces and melts at a high temperature the raw material containing a carbonaceous reducing agent such as coal and metal oxide contained substances such as iron ore, to produce reduced metal.

8. A processing method for high-temperature exhaust gas comprising:

blowing high-temperature exhaust gas discharged from a high-temperature gas generating source into a temperature control tower provided with not less than two extended step parts whose diameter is extended toward the downstream of the high-temperature exhaust gas, spraying cooling water toward the substantially center of a gas flow of the high-temperature exhaust gas blown, injecting cooling gas along the inner walls of the temperature control tower from cooling gas injection means provided on the extended step part, controlling the temperature so that the high-temperature exhaust gas blown assumes an adequate temperature, discharging and recovering solid dust separated from the high-temperature exhaust gas by the temperature control outside the temperature control tower, and recovering volatile or molten dust contained in the exhaust gas after having been controlled in temperature discharged from the temperature control tower by a bag filter.

* * * * *

UNITED STATES PATENT AND TRADEMARK OFFICE
CERTIFICATE OF CORRECTION

PATENT NO.    : 6,521,171 B2                                                Page 1 of 1
DATED         : February 18, 2003
INVENTOR(S)   : Tateishi et al.

It is certified that error appears in the above-identified patent and that said Letters Patent is hereby corrected as shown below:

<u>Title page,</u>
Item [45], and [*] Notice information should read:

-- [45] **Date of Patent:  *Feb. 18, 2003** --

-- [*]    Notice:  Subject to any disclaimer, the term of this
                   patent is extended or adjusted under 35
                   U.S.C. 154(b) by 0 days.

This Patent is subject to a Terminal Disclaimer --

Signed and Sealed this

First Day of July, 2003

JAMES E. ROGAN
*Director of the United States Patent and Trademark Office*